(12) United States Patent
Orr

(10) Patent No.: US 6,174,119 B1
(45) Date of Patent: Jan. 16, 2001

(54) CONNECTOR WITH INTEGRAL NAIL HOLDER

(76) Inventor: Tom Orr, 523 S. 14th St., Couerd'Alene, ID (US) 83814

( * ) Notice: Under 35 U.S.C. 154(b), the term of this patent shall be extended for 0 days.

(21) Appl. No.: 09/411,318

(22) Filed: Oct. 4, 1999

(51) Int. Cl.[7] .................................................. F16B 15/00
(52) U.S. Cl. ......................... 411/461; 411/469; 411/970; 411/999
(58) Field of Search .................................... 411/441, 457, 411/461–465, 469, 970, 999; 403/11, 12

(56) References Cited

U.S. PATENT DOCUMENTS

| | | |
|---|---|---|
| 1,586,370 | 5/1926 | Lange . |
| 2,389,344 * | 11/1945 | Constance ........................ 411/999 X |
| 3,498,171 | 3/1970 | Juriet . |
| 3,596,860 | 8/1971 | MacKay . |
| 3,633,950 | 1/1972 | Gilb ....................................... 52/289 |
| 3,811,644 | 5/1974 | Arnault ................................. 248/56 |
| 4,209,265 | 6/1980 | Mowhlenpah ....................... 403/230 |
| 4,296,520 * | 10/1981 | Arndt ................................. 403/12 X |
| 4,297,048 | 10/1981 | Juriet ................................... 403/189 |
| 4,318,628 | 3/1982 | Mancini ............................... 403/231 |
| 4,555,887 | 12/1985 | Rionda ................................. 52/712 |
| 5,178,503 * | 1/1993 | Losada ................................ 411/441 |
| 5,314,160 * | 5/1994 | Larsen ................................. 411/441 |
| 5,449,139 | 9/1995 | Herelier ............................... 248/300 |
| 5,634,756 * | 6/1997 | Losada ................................ 411/441 |
| 5,884,448 | 3/1999 | Pellock ................................. 52/643 |

FOREIGN PATENT DOCUMENTS

253054 * 7/1964 (AU) .................................... 411/461

OTHER PUBLICATIONS

USP Lumber Connectors, United Steel Products Company, 1988, Catalog.

* cited by examiner

Primary Examiner—Neill Wilson
(74) Attorney, Agent, or Firm—Tom Hamill, Jr.

(57) ABSTRACT

An improved connector with integrally attached fasteners is disclosed. In the embodiments described, the fasteners are nails and they are held in a sleeve. A flexible member attaches this sleeve to the body of the connector. In a first shipping or storage configuration, the fasteners are held flat against the body of the device. When it is desired to drive the fastener, a user moves one or more of the fasteners into a second, upright position. This aligns the fastener with the aperture present on the connector and the user then drives the nail home. Various rivet type attachments may be employed to secure the sleeve assembly to the apertures present on the connector through which the nail is driven. Additionally, the sleeve may include a corrugated interior to assist in gripping the nail more firmly in place. In another embodiment, this sleeve may be scored so that as the nail is driven, the sleeve splits and falls out of the way. Another contemplated embodiment of the invention is one in which a number of the flexible retainers are attached together such that when the user moves them into the upright position, all the fasteners are aligned with their respective apertures. The flexible retainers can be made of a variety of materials, such as plastic or metal and may further include a press fit clip, rivet, or the like incorporated into the aperture.

19 Claims, 5 Drawing Sheets

CONNECTOR WITH INTEGRAL NAIL HOLDER

BACKGROUND OF THE INVENTION

1. Field of the Invention

The present invention relates generally to connectors. More specifically, it relates to a connector that includes a plurality of apertures to allow two or more separate pieces of building material to be held in relation to one another. Even more specifically, it relates to a connector that also includes, integral to it, the nails used to hold it in place. Even yet more specifically, it relates to a connector with integral nails where the attached nails may be folded down to allow the connectors to be stacked and shipped with ease.

2. Description of the Prior Art

Two of the most common connectors used in construction are the joist hanger and the hurricane clip. The first of these is used to connect a joist or rafter to a beam, ledger, wall, or the like, and the second is used to connect the base of a roof truss to the plate to prevent the roof from lifting under a high wind load. The use of these types of connectors is required by the Uniform Building Code and so they are well nigh ubiquitous on any construction site. These types of corner type connectors, of which there are many other types require the use of a small tempered nail called a joist hanger or teko nail. These are small, usually 1¼" to 1⅝" long. Positioning these nails and then driving them often means, because of the small corner that the user is forced to work in, that the person installing the connector is forced to strike their own finger repeatedly. This makes the installation of these devices one of the most disliked jobs on any construction site. The present invention addresses this problem by having the nails be self-positioning, that is integral with the corner connector so that the installer only needs to move or flip the nail into position, and then hammer it home. The nail is held in the correct position by a sleeve that then may serve as a type of bushing to completely fill the aperture when the nail is driven completely in. Thus, a corner connector is provided that allows the installer to hold the connector and drive the nail without having the inconvenience of striking the holding hand.

The following prior art is known.

U.S. Pat. No. 1,586,370 issued to William F. Lange on May 25, 1926 discloses a tub fastener. This is clearly dissimilar from the present invention as no flexible sleeve for holding a nail is seen.

In U.S. Pat. No. 3,498,171 issued to John C. Jureit on Mar. 3, 1970 there is disclosed a connector that teaches nails stamped out integrally with the connector element. Unlike the present invention, however, there is no teaching of the novel sleeve that holds the nail in place over each connector aperture.

U.S. Pat. No. 3,596,860 issued to George MacKay on Aug. 3, 1971 there is disclosed a electrical plate bracket that includes nails held in a sleeve. Unlike the present invention, the sleeves are not flexible so that they can be bent out of the way.

U.S. Pats. Nos. 3,633,950, 4,209,265, 4,555,887, 4,297,048, and 4,318,628 all show angled connectors of various kinds. None of them, though, show the flexible nail retaining means of the instant invention.

U.S. Pat. No. 3,811,644 issued to Warren J. Arnault on May 21, 1974 discloses a pipe hanger. As in the patents discussed above, there is no flexible retainer for the fasteners.

In U.S. Pat. No. 4,079,656 issued to Donald R. Church on Mar. 21, 1978 there is disclosed a one piece fastener. No flexible retaining arrangement is shown that would allow the prongs of Church to lie flat as is seen in the instant invention.

Next is U.S. Pat. No. 5,449,139 issued to Patrick Herelier on Sep. 12, 1995. The fastener taught in this document is unlike the present invention in that the nails or fixing components cannot lay flat to allow for ease in shipping and storage.

Lastly, U.S. Pat. No. 5,884,448 issued to Michael A. Pollock on Mar. 23, 1999 discloses a truss spacer. A tongue with an integral nail formed on it is at each end. There is no flexible retaining means shown for these nails as is required in the instant invention.

Thus, while the foregoing overview of prior art indicates it to be well known to use integrally attached fasteners in various connectors, the unique construction of applicant's invention is not shown in any of them. A flexible retainer for the nail allows the user enhanced ease in the installation of these connectors on a construction site, providing a "hand-free" environment that speeds installation time, prevents injury, and saves in labor costs.

SUMMARY OF THE INVENTION

To achieve the foregoing and other advantages, the present invention, briefly described, provides an improved connector with integrally attached fasteners. In the embodiments described herein, the fasteners are nails and they are held in a sleeve, A flexible member attaches this sleeve to the body of the connector. In a first shipping or storage configuration, the fasteners are held flat against the body of the device. When it is desired to drive the fastener, a user moves one or more of the fasteners into a second, upright position and drives the nail home. Various embodiments include different rivet type attachments affixed to the apertures through which the nail is driven. Additionally, the sleeve may include a corrugated interior to assist in gripping the nail more firmly in place. In another embodiment, this sleeve may be scored so that as the nail is driven, the sleeve splits and falls out of the way. Another contemplated embodiment of the invention is one in which a number of the flexible retainers are attached together such that when the user moves them into the upright position, all the fasteners are aligned with their respective apertures. The flexible retainers can be made of a variety of materials, such as plastic or metal and may further include a press fit clip, rivet, or the like incorporated into the aperture.

Thus it is a principal object of the invention to provide a novel connector that includes a flexible retainer for all the fasteners required to attach the connector to its various building components.

It is a further object of the invention to provide a novel connector that has the fasteners fittingly engaged with the retainers such that they may be positioned and held over the corresponding aperture through which they are to be driven.

Still yet a further object of the invention is to allow for selected numbers of fasteners to be positioned so that the user can strike specified fasteners one at a time, preventing fasteners at corner angles to one another from interfering with the striking of each other.

Yet another object of the invention is to provide a novel connector where the integral fasteners or nails are folded down against the body of the connector for ease in shipping, handling, and storage.

Still yet another object of the invention is to provide a novel connector wherein the flexible retainer includes a sleeve that holds the nail firmly in place.

Yet another object of the invention is to provide a novel connector wherein the flexible retaining means forms a bushing in the connector aperture as the fastener is driven.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 10 shows a single fastening nail being moved from the first stored position to the final, aligned position in preparation for its being nailed in.

DESCRIPTION OF THE PREFERRED EMBODIMENTS

Figure 1:
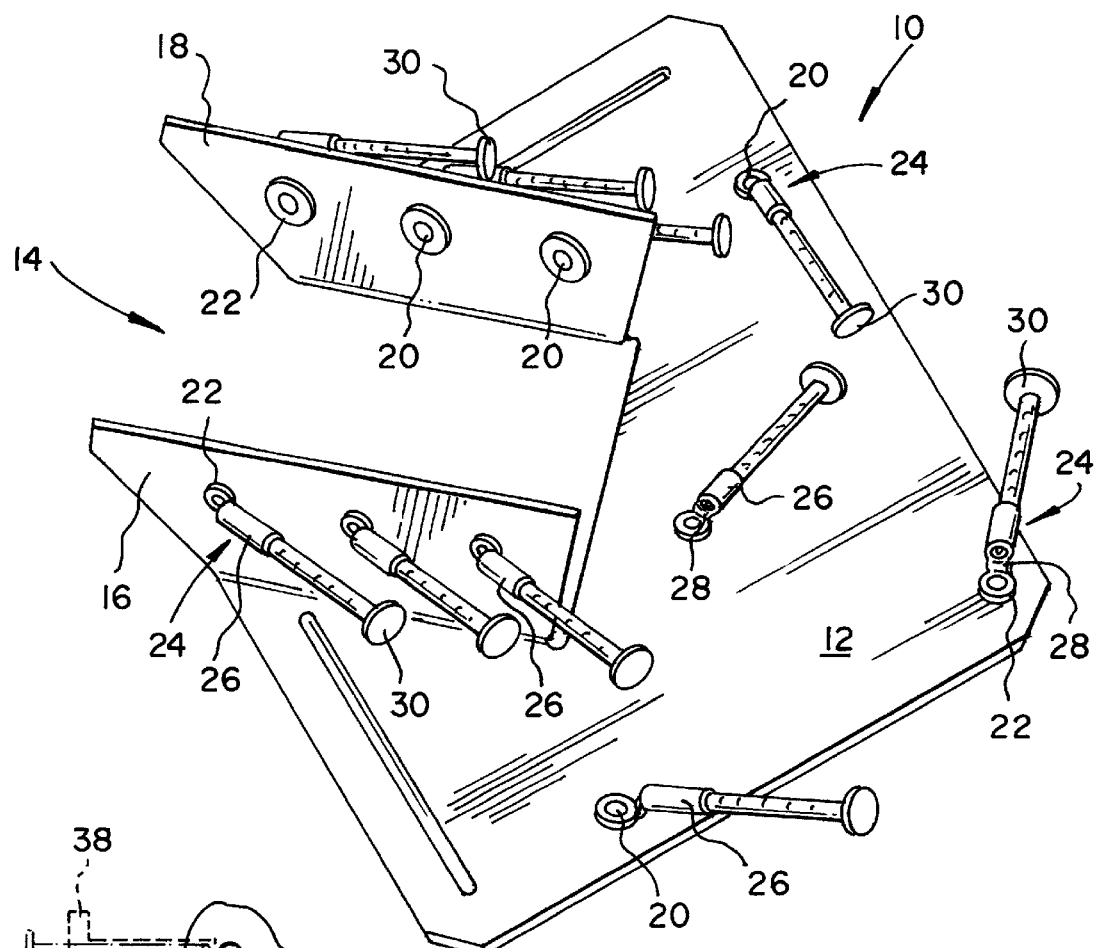
FIG. 1 is perspective view of one embodiment of the present invention, adapted to a rafter or hurricane tie type of connector.

Referring to FIG. 1, the invention is shown adapted in use on a rafter or hurricane-type tie or connector 10. the connector 10 has a primary flat face 12 and a roof truss receiving slot 14 that includes perpendicular walls 16,18. In both primary flat face 12 and perpendicular walls 16 and 18 there are a plurality of apertures 20.in each aperture 20 there is placed the aperture retaining portion 22 of flexible retaining members 24. Each retaining member 24 also includes a nail sleeve 26 and a strap portion 28. The joist hanger nails 30 are held in the nail sleeves 26. Note that in this embodiment of FIG. 1, all of the nails 30 and their associated flexible retaining members 24 are in the first, or storage position. This is how the hurricane type connector 10 would be shipped and stored prior to use. It can be seen in FIG. 1 that in this type of tie connector 10, the perpendicular walls 16,18, by being at the angle that they are make it important that the nails 30 be kept in this stored position as the nails 30 associated with the perpendicular walls 16 and 18 would interfere with the driving of the nails 30 associated with the primary plate 12. One by one, the flexible retaining members 24 are moved into the second final, aligned position (discussed further below) and then driven into the aperture 20. Thus there is no need for the user's hand (not shown) to be anywhere near the nail as it is being hammered in, lowering the risk of inadvertent injury to almost nothing and additionally making the whole process of attaching these connectors much simpler and faster. It is estimated that the time spent connecting both hurricane type ties and the like could be reduced by half with the adoption of the present invention, thus saving labor costs.

Figure 2:
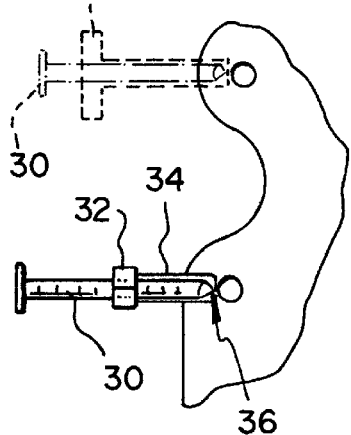
FIG. 2 is plan view showing two different embodiments of the invention as regards the sleeve or retainer for the nail. The sleeves may come in a variety of sizes, widths, and shapes, depending on the purpose for which they are to be used.

Turning to FIG. 2, different varieties of sleeves and straps are shown. Note that in FIG. 2, the nail 30 is retained in a sleeve 32 markedly further up the body of the nail 30 than is seen in FIG. 1. Thus, an extended strap portion 34 is created that pivots at the point indicated at 36. In this embodiment of the invention, there is no aperture retaining portion 22 as is described in FIG. 1. In this embodiment, it is contemplated that the engagement means for the invention would be a spot weld at point 36. Other types of attachments could be used, such as a glue or the like that has sufficient resiliency and adhesive capability when dried to both hold the nail 30 in place and to maintain it in the aligned position. Another embodiment shown in dotted lines, has an enlarged portion 38 to allow the user to grip extended strap portion 34 more easily and move the nail 30 into the aligned position.

Figure 3:
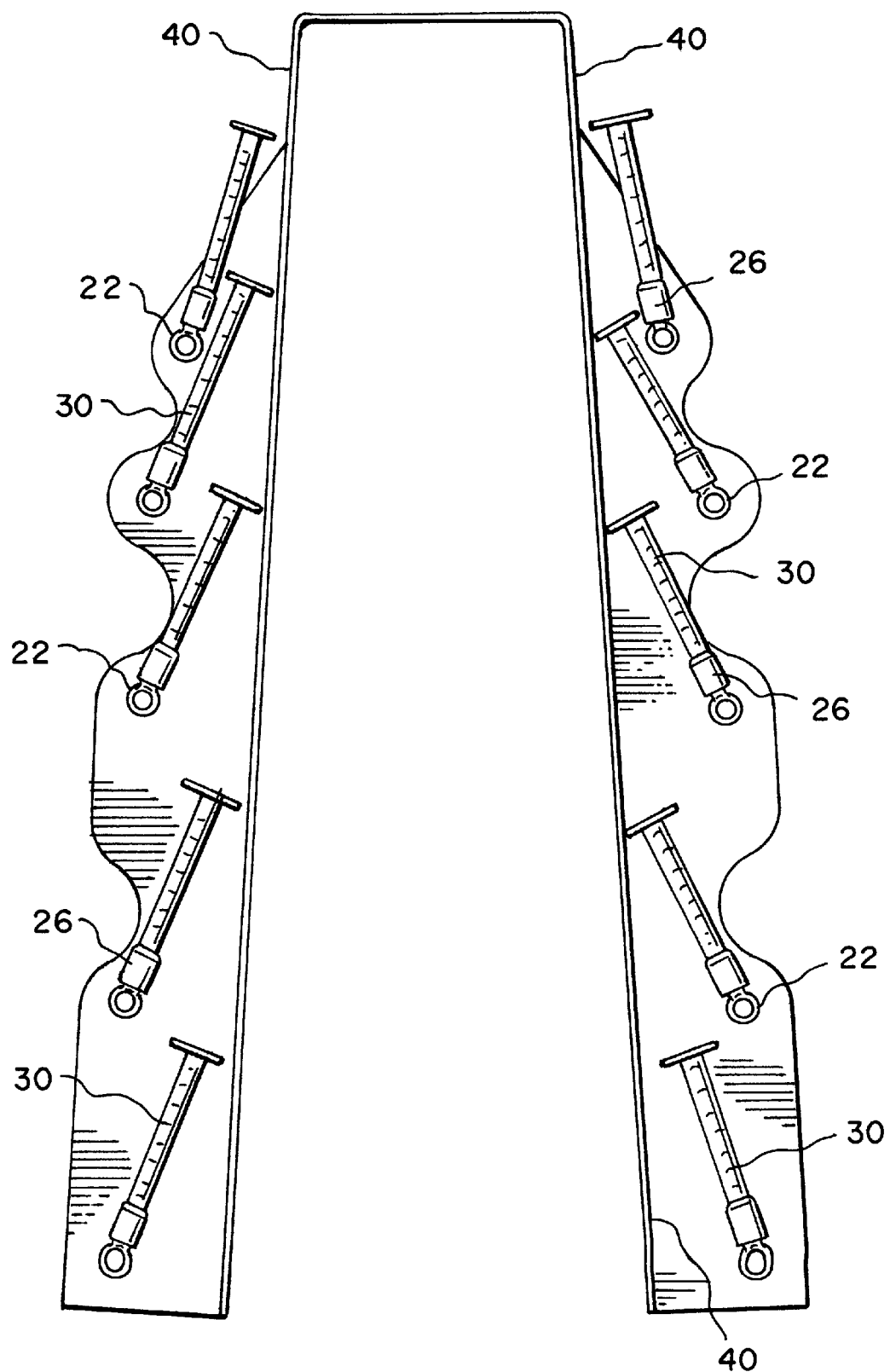
FIG. 3 is a view of the invention adapted for use in a hangar.

Turning to FIG. 3, a front view of an embodiment of the invention adapted to be used on a joist hanger connector is shown. Note that the nails that would normally be present on walls 40 have been deleted for clarity. This is substantially the same arrangement as was seen in FIG. 1, where the nails are moved into the aligned position one by one and driven in. It should be emphasized at this point that the present invention may be adapted to any number of connectors. Not only joist hangers and hurricane clips may be employed, but beam seats, floor girder hangers, post caps or bases, column caps, face mount hangers, and straps could be manufactured according to the present invention. Additionally, nails are not the only fasteners that could be employed. Threaded fasteners could work as well.

Figure 4:
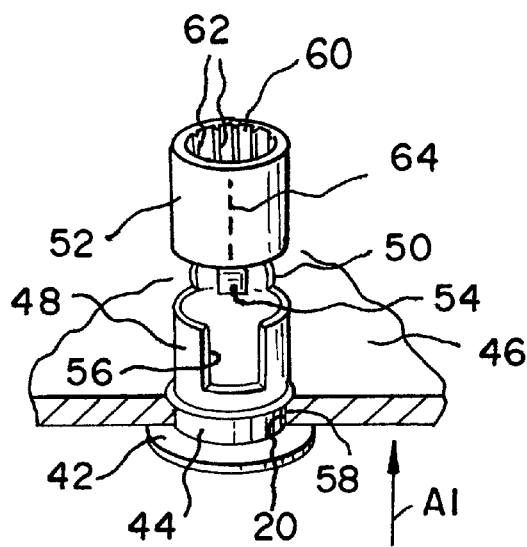
FIG. 4 is a perspective partial view of an embodiment of the invention with the fastener nail excluded for clarity. In this embodiment, which is preferably made of plastic, the sleeve is scored and frangible, so that it breaks away when the nail is driven. Additionally, the inside of the sleeve is corrugated to grip the fastening nail more securely. A molded living hinge which rotates approximately ninety degrees is attached to hold the nail in the upright aligned position.

Another embodiment of the present invention is seen in FIG. 4. This embodiment is contemplated of being made primarily from a soft resilient plastic material. For purposes of this application, a living hinge may be defined as a molded plastic spring hinge, used to hold the nail in it's down position when not employed, or to hold the nail in an upright position when employed. This definition may be extended to encompass other configurations of unitary hinges, which fold about a central axis, where it may be maintained in either the first position or the second position. There is a bottom flange 42 a detent portion 44 to engage the connector 46, a notched guide 48, a hinge portion 50 and the nail sleeve 52. In the hinge portion 50 there is a living hinge 54 that would have sufficient stiffness to hold the nail sleeve 52 and the nail (not shown in FIG. 4) in the aligned position when placed there. Living hinge 54 could be made from any deformable material, including plastics or in some cases metals. Notch 56 is adapted to allow for the passage of the tip of the nail (not shown in FIG. 4) as the apparatus is moved into the aligned position. The notch 56 may also be made slightly smaller that the tip of the nail, so as to act as a clip to further secure the nail in an upright position. In this embodiment of the invention nail sleeve 52 would be inserted through the aperture 58 in connector 46 in the direction indicated by arrow A1. Detent portion 44 is sized such that it grips connector 46 firmly. On the interior wall 60 of nail sleeve 52 are corrugations 62. These corrugations 62 serve to grip the nail more firmly after it is inserted. Another feature of this embodiment of the invention is that there is a scored break line 64 extending down the nail sleeve 52. This scored break line 64 serves to make nail sleeve 52 frangible as the nail is hammered in.

Figure 5:
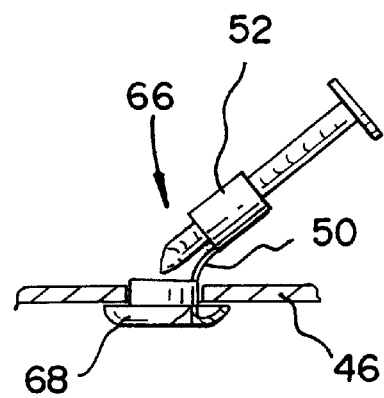
FIG. 5 is a partially cut-away side view of the embodiment in FIG. 4.
Figure 6:
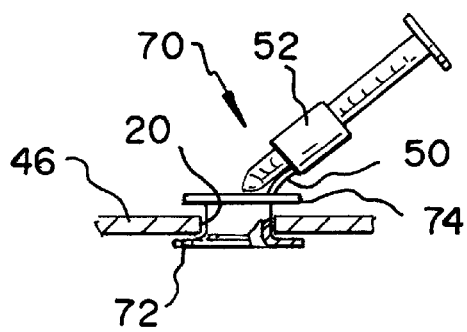
FIG. 6 is a partially cut-away side view of an embodiment of the invention where the retaining means is a press fit-type rivet flanged on both sides of the connector body.
Figure 7:
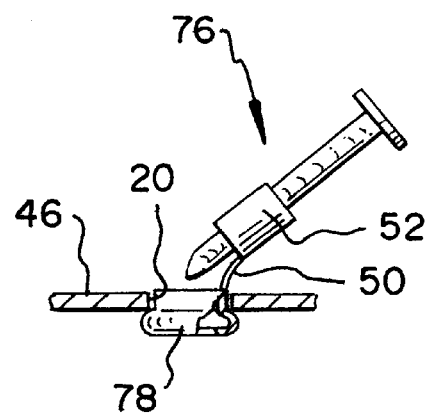
FIG. 7 is a partially cut-away side view of an embodiment of the invention where the retaining means has an expansion fit within and through the aperture.

FIGS. 5, 6, and 7 illustrate various embodiments with different means for attaching the nail retaining and guiding means to the connector 46. In FIG. 5, nail retaining and guiding means 66 is flanged on the contact side of connector 46 as indicated at 68. Nail sleeve 52 and hinge portion 50 are substantially the same as have been described above in the discussion of FIG. 4. FIG. 5 shows an embodiment wherein the nail retaining and guiding means 70 is flanged on both the contact and the nailing side as indicated at 72 and 74. Nail sleeve 52 and hinge portion 50 are substantially the same as described above. FIG. 7 shows an expansion fit within the aperture 20 to hold the nail retaining and guiding means 76. The expansion fit is indicated at 78 in FIG. 7. The engagement of the nail retaining and guiding means 66, 72, 76 within aperture 20 could be accomplished in many other ways. Additionally, the materials with which nail retaining and guiding means 66, 72, and 76 are made are various. Any resiliently deformable material would serve. Various metals, plastic, or combinations of the two would fall within the scope of the present invention and would present themselves to the skilled practitioner. Materials which lend themselves to be molded or stamped may be considered to be preferable.

Figure 8:
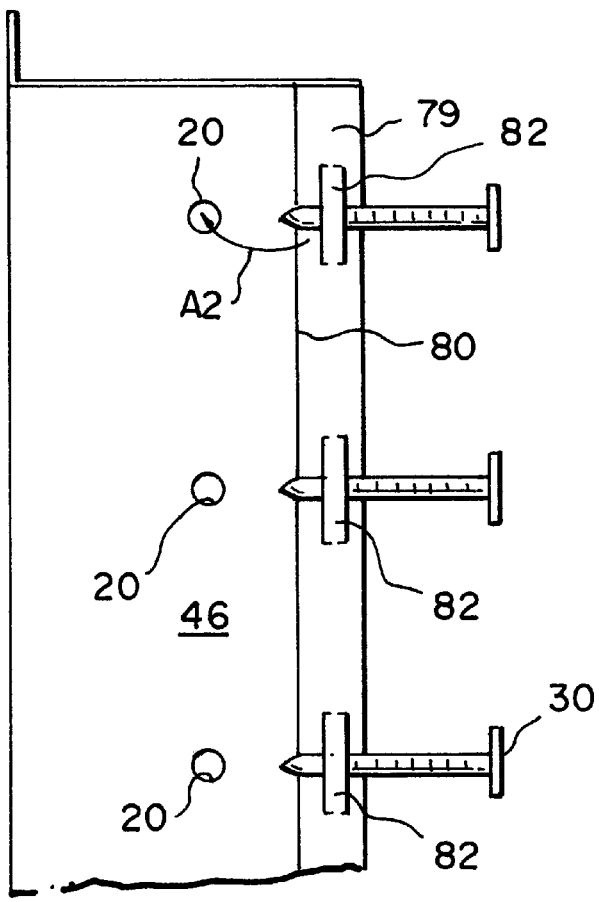
FIG. 8 is a view of another embodiment of the invention where a plurality of fastening nails are held on a single strap-like retainer having a stamped hinge point at its base, where they can all simultaneously be moved into position to be driven into their respective apertures.

In many hangers or straps, the apertures 20 are linearly disposed. An example of this is seen in FIG. 8. Since the nails 30 are not in a position to interfere with one another if they are simultaneously in the aligned position, a hinged flap 79 is attached to the body of the connector 46. The hinge line is indicated at 80 in FIG. 8. There are a plurality of protruding sleeves 82 along the hinge flap 78 that engage the nails 30. The flap 78 is moved about hinge line 80 as indicated by directional arrow A2 and the nails 30 are brought into alignment with apertures 20.

Figure 9:
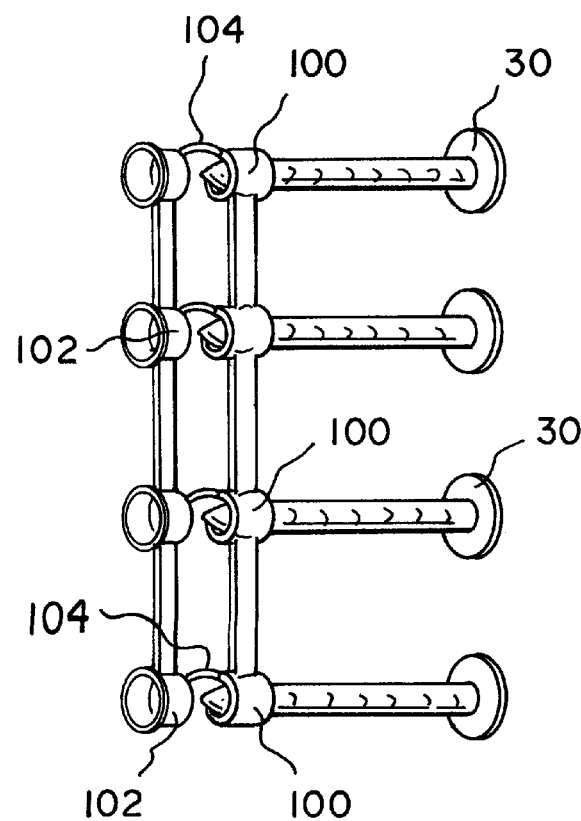
FIG. 9 is a perspective view of another embodiment similar to that shown in FIG. 8.

In FIG. 9, nails 30 are held in sleeves 100. Aperture engagement portions 102 are placed within the apertures and the hinge means 104 along with the sleeve bar 106 brings the nails into linear alignment.

Figure 10:
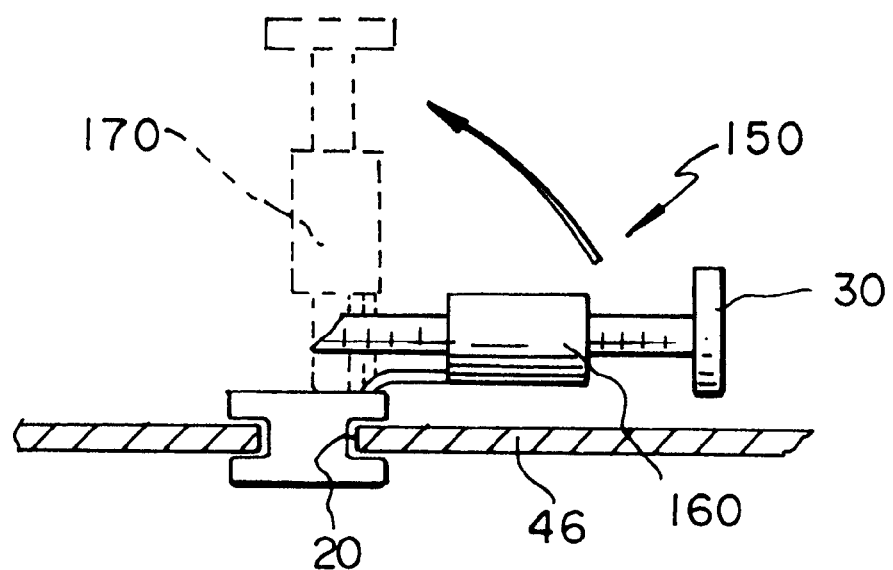

The operation of the instant invention is represented in FIG. 10. The connector is brought into position in which it is required to be fastened. The nails 30 and the nail retaining and guiding means 150 are in the first storage position as indicated in solid lines at 160. A predetermined number of selected nails 30 are brought into the second, aligned position (indicated at 170 in the Figure) and then the nails can be driven into the building material while the user's hand is a safe distance away. This safety feature increases morale on the construction site, reduces medical costs, and can cut hanger and clip installation by as much as 50%.

What is claimed as being new and desired to be protected by Letters Patent of the United States is as follows:

1. A impact driven fastener retaining and guiding apparatus for a connector having at least one aperture, comprising:
   aperture engagement means;
   fastener engagement means; and
   a hinge located between said aperture engagement means and said fastener engagement means; whereby
   a fastener is engaged by said fastener engagement means, and an aperture on said connector is engaged by said aperture engagement means, and said fastener may be brought selectively into alignment with said aperture by said hinge such that said fastener may be driven through said aperture by the user.

2. The impact driven fastener retaining and guiding apparatus according to claim 1, said connector having at least one planar surface including a contact side and a fastener side and where said aperture engagement means includes a flange extending outward on said contact side of said connector.

3. The impact driven fastener retaining and guiding apparatus according to claim 2, said fastener engagement means comprising a generally cylindrical tube configured to retain a nail.

4. The impact driven fastener retaining and guiding apparatus according to claim 3 wherein said living hinge includes a deformable hinge.

5. The impact driven fastener retaining and guiding means according to claim 4, wherein said connector is a joist hanger.

6. The impact driven fastener retaining and guiding means according to claim 4, wherein said connector is a hurricane clip.

7. The impact driven fastener retaining and guiding apparatus according to claim 1, said connector having at least one planar surface including a contact side and a fastener side and where said aperture engagement means includes a flange extending outward on both said contact side and said fastener side of said connector.

8. The impact driven fastener retaining and guiding apparatus according to claim 7, said fastener engagement means comprising a generally cylindrical tube configured to retain a nail.

9. The impact driven fastener retaining and guiding apparatus according to claim 1, wherein said hinge includes living hinge.

10. The impact driven fastener retaining and guiding means according to claim 9, wherein said connector is a joist hanger.

11. The impact driven fastener retaining and guiding means according to claim 9, wherein said connector is a hurricane clip.

12. A impact driven fastener retaining and guiding apparatus for a connector having at least one aperture, comprising:
   aperture engagement means;
   fastener engagement means; and
   a deformable hinge located between said aperture engagement means and said fastener engagement means, whereby
   a fastener is engaged by said fastener engagement means, and an aperture on said connector is engaged by said aperture engagement means, and said fastener may be brought selectively into alignment with said aperture by said deformable hinge such that said fastener may be driven through said aperture by the user.

13. The act driven fastener retaining and guiding apparatus according to claim 12, wherein said fastener engagement means comprises a generally cylindrical tube configured to retain a fastener selected from the group comprising a nail and a screw.

14. The act driven fastener retaining and guiding means according to claim 13, wherein said connector is a joist hanger.

15. The act driven fastener retaining and guiding means according to claim 13, wherein said connector is a hurricane clip.

16. A fastener retaining and guiding apparatus for a connector having at least one aperture, each aperture having an associated fastener; comprising:

aperture engagement means;

fastener engagement means for engaging at least two fasteners; and a living hinge located between said aperture engagement means and said fastener engagement means, where said deformable hinge comprises a pivot point between said aperture engagement means and said fastener engagement means; whereby a plurality of fasteners are engaged by said fastener engagement means, and an aperture on said connector is engaged by said aperture engagement means, and each said fastener may be brought selectively into alignment with its associated said aperture by said deformable hinge such that each said fastener may be driven through each said associated said aperture by the user.

17. The fastener retaining and guiding apparatus according to claim 16, wherein said fastener engagement means comprises a generally cylindrical tube configured to retain a nail.

18. The fastener retaining and guiding means according to claim 17, wherein said connector is a joist hanger.

19. The fastener retaining and guiding means according to claim 17, wherein said connector is a hurricane clip.

* * * * *